United States Patent [19]
Miller et al.

[11] Patent Number: 5,195,711
[45] Date of Patent: Mar. 23, 1993

[54] MULTIPLE CONTAINER HOLDER

[75] Inventors: Gordon Miller; Ronald Dykstra; David Spykerman; Joseph Buonodono, all of Holland, Mich.

[73] Assignee: Prince Corporation, Holland, Mich.

[21] Appl. No.: 764,456

[22] Filed: Sep. 24, 1991

Related U.S. Application Data

[60] Division of Ser. No. 627,554, Dec. 10, 1990, Pat. No. 5,087,008, which is a continuation of Ser. No. 379,816, Jul. 14, 1989, abandoned.

[51] Int. Cl.⁵ .............................................. A47C 7/62
[52] U.S. Cl. .................................. 248/311.2; 248/313; 224/275; 224/42.42; 297/194
[58] Field of Search ................ 248/311.2, 313, 312, 248/312.1; 297/194; 224/42.42, 275

[56] References Cited

U.S. PATENT DOCUMENTS

| | | |
|---|---|---|
| 2,640,595 | 6/1953 | Byford . |
| 2,778,702 | 1/1957 | Franks . |
| 3,136,578 | 6/1964 | Tihovici . |
| 3,606,112 | 9/1971 | Cheshier . |
| 4,040,659 | 8/1977 | Arnold . |
| 4,417,764 | 11/1988 | Marcus et al. . |
| 4,511,072 | 4/1985 | Owens . |
| 4,583,707 | 4/1985 | Anderson . |
| 4,645,157 | 2/1987 | Parker . |
| 4,708,386 | 11/1987 | Moore et al. . |
| 4,728,018 | 3/1988 | Parker . |
| 4,733,908 | 3/1988 | Dykstra et al. . |
| 4,738,423 | 4/1988 | DiFilippo et al. . |
| 4,756,572 | 7/1988 | Dykstra et al. . |
| 4,759,584 | 7/1988 | Dykstra et al. . |
| 4,783,037 | 11/1988 | Flowerday . |
| 4,792,184 | 12/1988 | Lindberg et al. . |
| 4,818,017 | 4/1989 | Dykstra et al. . |
| 4,828,211 | 5/1989 | McConnell et al. . |
| 4,848,627 | 7/1989 | Maeda et al. . |
| 4,854,536 | 8/1989 | Lorence et al. . |
| 4,892,281 | 1/1990 | DiFilippo et al. . |
| 4,907,775 | 3/1990 | Lorence et al. . |
| 4,928,865 | 5/1990 | Lorence et al. ............ 248/311.2 X |
| 4,953,771 | 9/1990 | Fischer et al. . |

FOREIGN PATENT DOCUMENTS 443562  4/1927  Fed. Rep. of Germany .

*Primary Examiner*—Alvin C. Chin-Shue
*Attorney, Agent, or Firm*—Price, Heneveld, Cooper, DeWitt & Litton

[57] ABSTRACT

A container holder selectively allows the compact storage of the container support assembly including overlapping sections for allowing use of the container holder selectively for one or two containers. The assembly occupies a relatively small space for compact storage in a vehicle armrest.

22 Claims, 8 Drawing Sheets

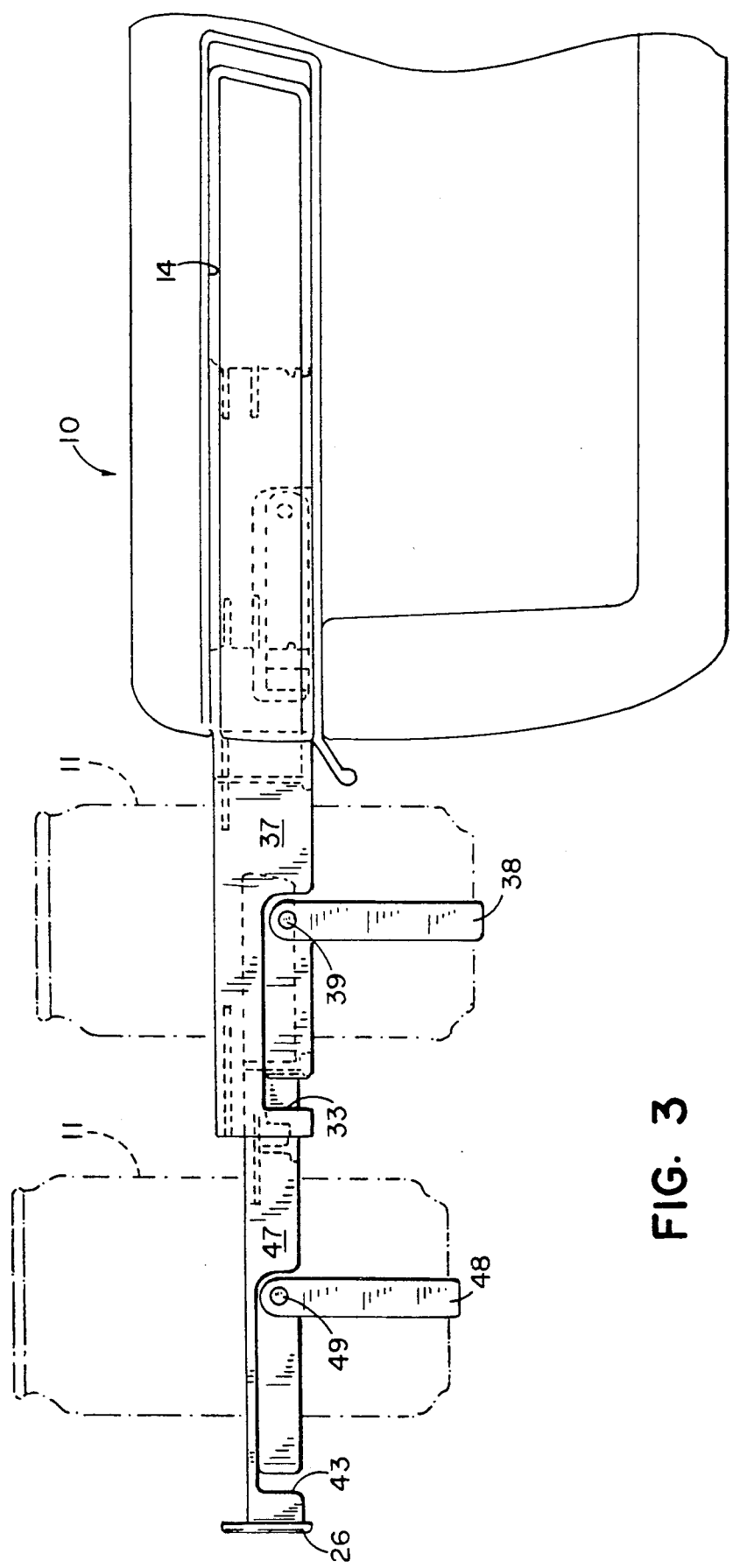

MULTIPLE CONTAINER HOLDER

This is a divisional of co-pending application Ser. No. 07/627,554 filed on Dec. 10, 1990 (now U.S. Pat. No. 5,087,008, issued Feb. 11, 1992) which is a continuation of U.S. patent application Ser. No. 07/379,816, filed Jul. 14, 1989, now abandoned.

BACKGROUND OF THE INVENTION

The present invention pertains to a container holder for a vehicle and particularly one which can be integrated into a vehicle armrest and support multiple containers.

There exists a variety of container holders for use in vehicles, some of which display the capability of providing support for multiple containers U S. Pat. Nos. 4,417,764 and 4,756,572 each disclose armrest mounted container holders having structure which supports two or more containers or cups in the armrest area of a vehicle, typically located between the front seats of an automobile.

SUMMARY OF THE PRESENT INVENTION

The container holder of the present invention includes a pair of sections which are movable to selectively overlap to support one or two containers. The container holder occupies a relatively small space for compact storage in a vehicle armrest or other vehicle location where space is at a premium. These and other features, objects and advantages of the present invention will become apparent upon reading the following description thereof together with reference to the accompanying drawings in which:

BRIEF DESCRIPTION OF THE DRAWINGS

FIG. 3 is an enlarged fragmentary side elevational view of the structure, shown in FIG. 2;

DETAILED DESCRIPTION OF THE PREFERRED EMBODIMENT

Figure 1:
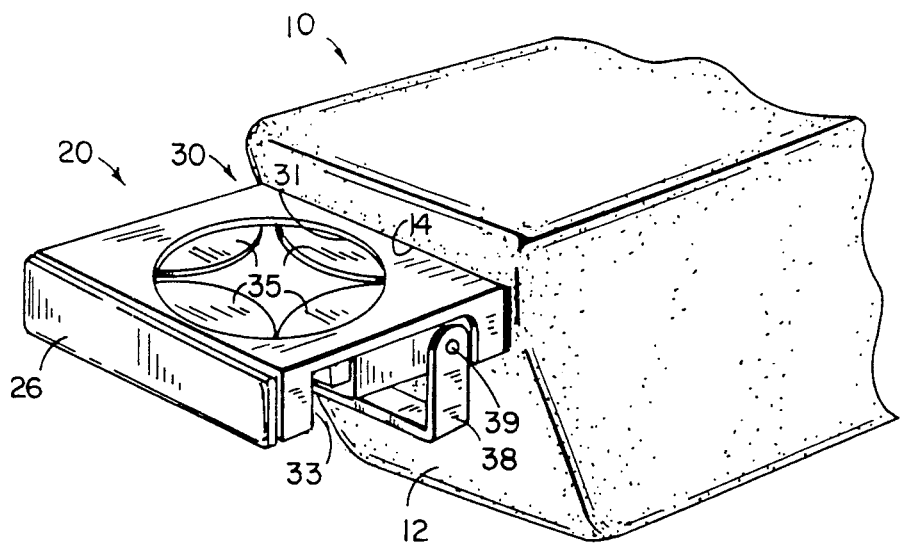
FIG. 1 is a fragmentary perspective view of a first embodiment of the present invention shown in a first use position.
Figure 2:
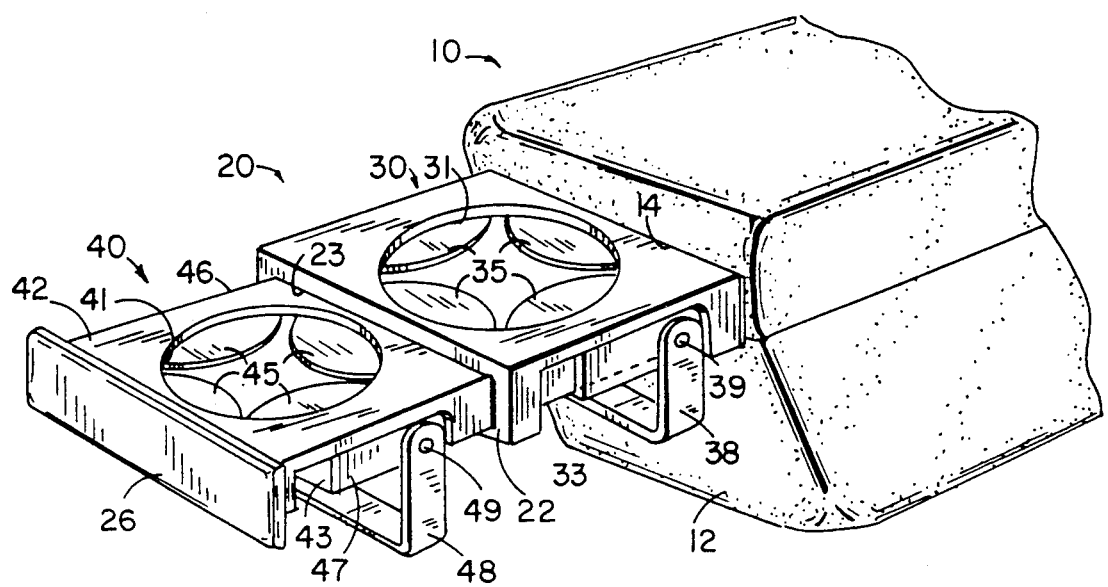
FIG. 2 is a fragmentary perspective view of the structure shown in FIG. 1 withdrawn from the armrest to a second use position.

Referring initially to FIGS. 1-6 there is shown the front portion of a vehicle armrest 10 which may be mounted in a conventional manner to the front seat area of a vehicle between the driver and passenger sides and which includes a forward wall 12 having a rearwardly projecting generally rectangular recess 14 (FIG. 6) extending therein for receiving a container holder assembly 20 of the present invention. The recess 14 is lined with a guide and support base 15 for receiving the container holder assembly which includes a first or inner section 30 and a second or outer section 40 which telescopes within section 30 and both sections slide into the base 15 in armrest 10. As seen in FIG. 1 the armrest assembly 20 can be partially extended to reveal only the first container holder section 30 for holding a single container or fully extended as illustrated in FIG. 2 for holding two containers such as cups or cans.

The inner section 30 comprises a top wall 32 having an aperture 31 formed downwardly therein and a lower wall 34 (FIG. 5A) between which there is compressibly held four arcuate shaped resilient discs 35 spaced at equal intervals around the periphery of aperture 31 and made of a flexible foam polymeric material for urging against the side walls of a container such as a can 11 as seen in FIG. 3 to snugly hold a container to the holder. Section 30 also includes a pair of side walls 36 and 37 and a pivoted generally U-shaped bail 38 having its ends pivotally mounted to the side walls 36 and 37 by means of pivot pins 39. These side walls include a slotted aperture 33 formed therein such that bail 38 can pivot upwardly into slot 33 as the first section 30 is pushed rearwardly. Section 30 also includes a forward wall 22 having an aperture 23 (FIG. 2) formed therein for telescopically receiving the outer section 40.

Figure 4:
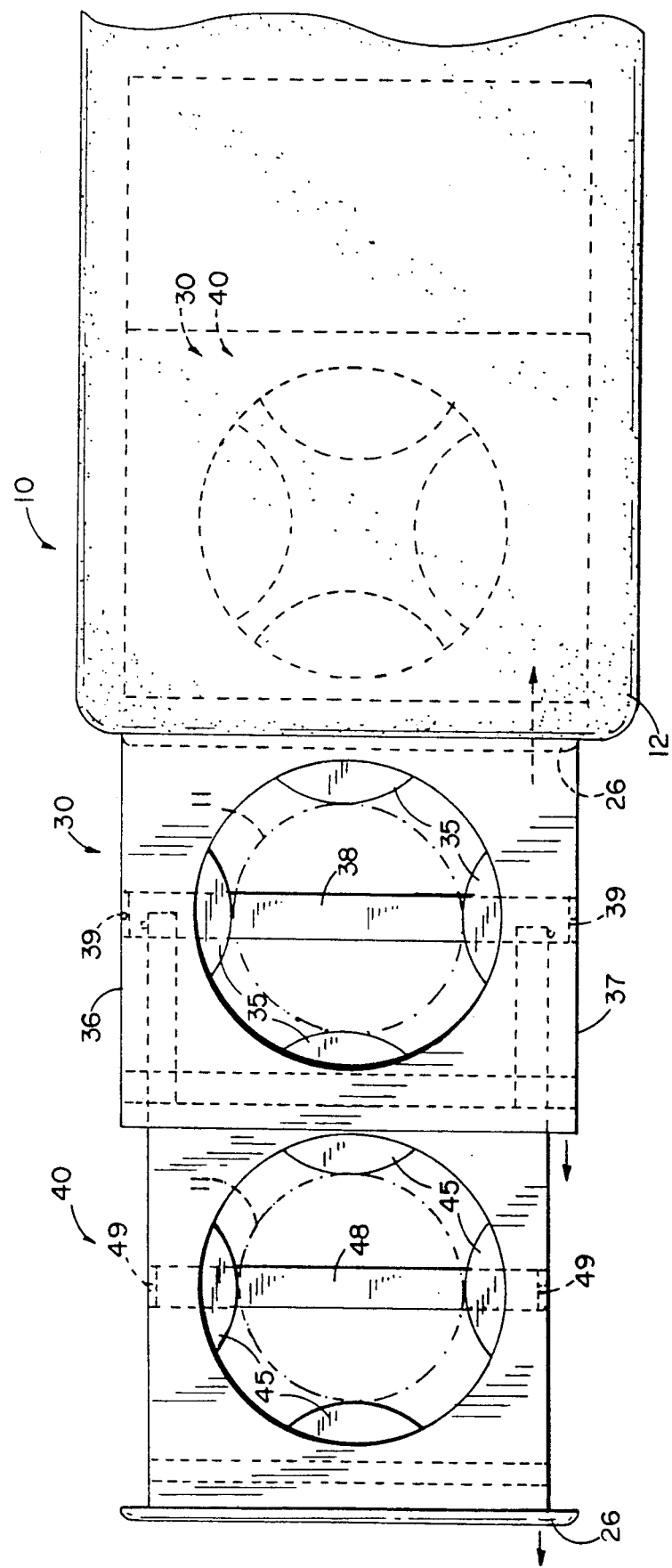
FIG. 4 is a fragmentary top plan view of the structure shown in FIG. 3.

Section 40 like section 30, includes an upper wall 42, side walls 46 and 47 and a generally U-shaped bail 48 pivotally mounted under a circular aperture 41 by means of pivot pins 49 on either side. Side walls 46 and 47 also include a notch 43 formed therein for receiving bail 48 which pivots forwardly into notch 43 for storage within the recess 23 of member 30 as seen in FIG. 1. In this first position, apertures 31 and 41 are coaxially aligned in a vertical direction to allow the use of the container holder for a single container. Notches 43 and 33 align when the container holders are in this first position. The outer section 40 also includes a pair of legs 46' and 47' integral with side walls 46 and 47 respectively and extending rearwardly for providing support of the second section 40 in a cantilevered fashion from the recess 23 in first section 30 as seen in FIGS. 2-4. The front edge of section 40 includes a generally flat rectangular cover 26 which provides a trim appearance to the container holder once in the fully collapsed position within the recess 14 of armrest 10.

Figure 5:
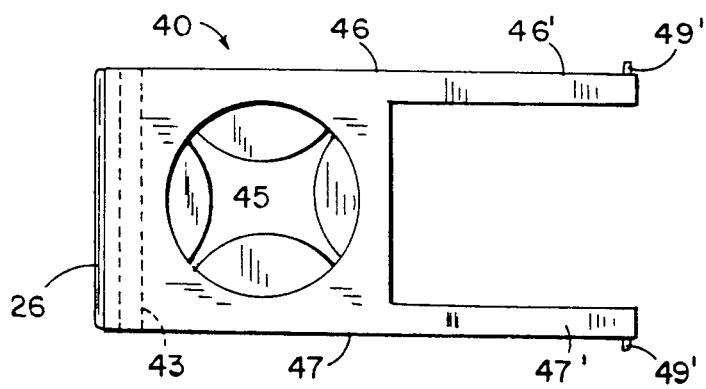
FIG. 5 is a top plan view of a portion of the structure shown in FIGS. 1-4.
Figure 5A:
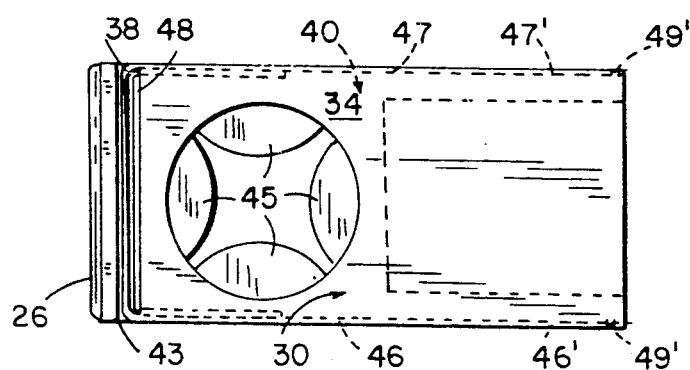
FIG. 5A is a bottom plan view of the structure shown in FIG. 5.
Figure 6:
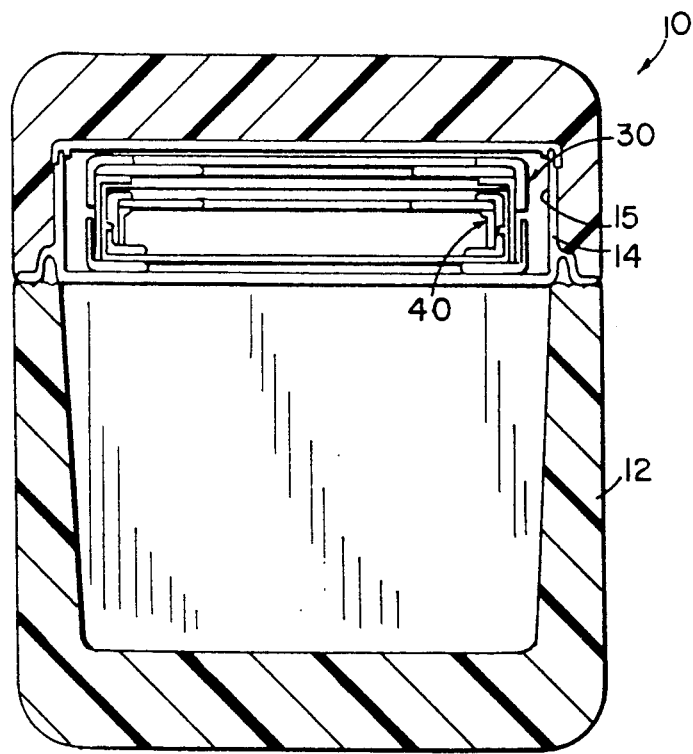
FIG. 6 is a front elevational view of the structure shown in FIGS. 1-4 shown in a stored position nested within the vehicle armrest with the outer cover removed.

The two sections 30 and 40 may slide within the base 15 which as seen in FIG. 6 is a generally rectangular container to provide a lubricious interface between the members 30 and 40. A suitable conventional catch (not shown) can be provided to prevent extraction of the entire container holder from the armrest as well as providing a push release for initial extension of the armrest. With bail 38 extended upwardly in the notches 33 and 43 of assembly 20 as seen in FIG. 5A, bail 38 serves to lock the two sections 30 and 40 together, such that pulling on cover 26 extends both sections from the armrest together. Only after bail 38 is lowered as seen in FIG. 1 does the innersection 40 unlock and allow its further extension as seen in FIG. 2. Arms 46' and 47' each include outwardly extending tabs 49' (FIG. 5) which interlock in suitable notches (not shown) on the interior of side walls 36 and 37 of section 30 to prevent full extension of section 40 from section 30.

The container holder 20 therefore provides a compact telescopic multiple container holder which allows use as shown in FIG. 1 or FIG. 2 or compact storage within the armrest in a relatively small area as illustrated in FIG. 4 in phantom form. The container holder 20 may be molded of a resilient polymeric material such as ABS, polycarbonate or like suitable material.

Figure 7:
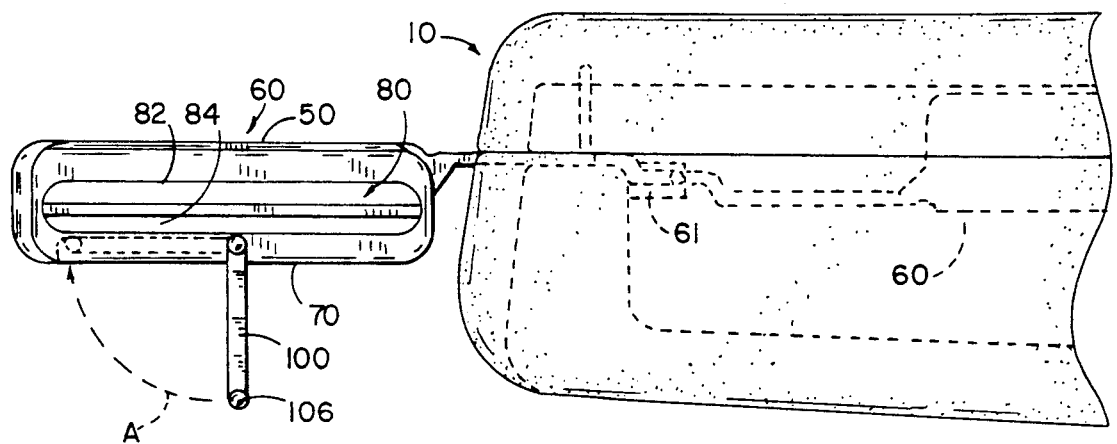
FIG. 7 is a side elevational view partly in phantom form of an alternative embodiment of the present invention.
Figure 8:
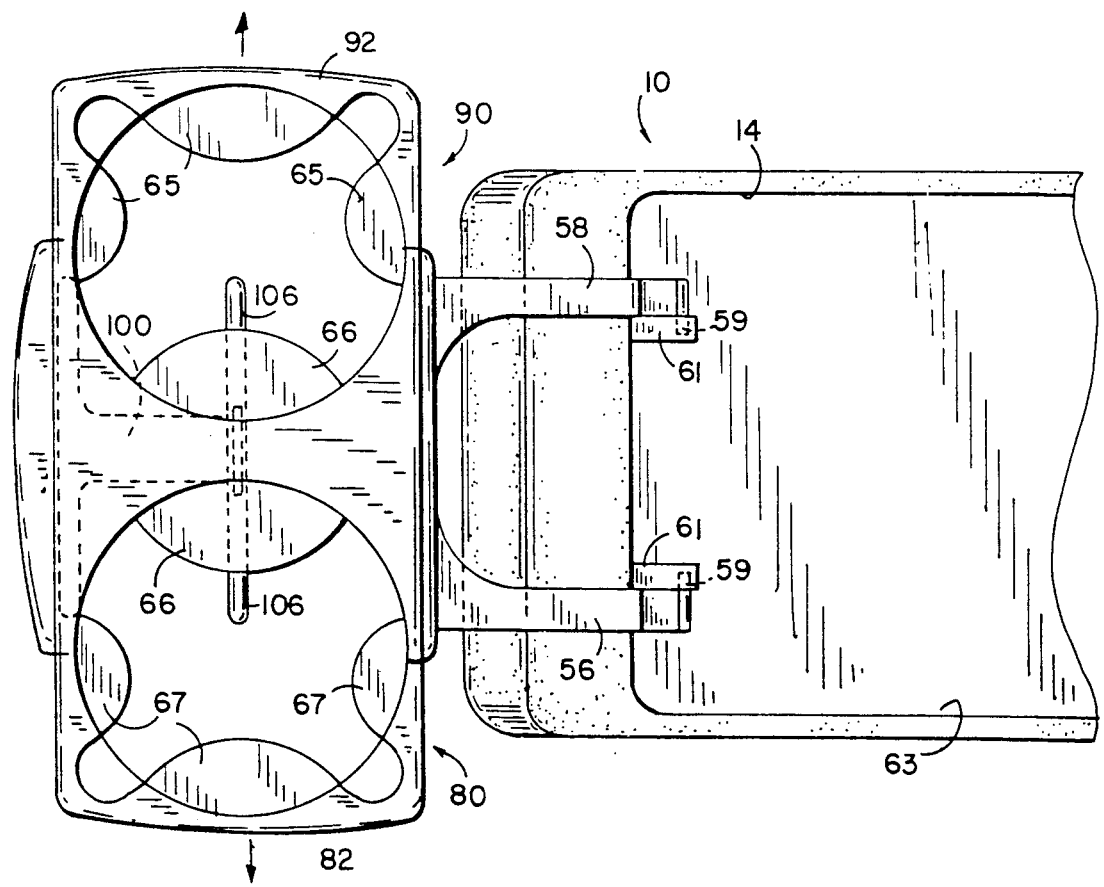
FIG. 8 is a top plan view of the structure shown in FIG. 7.
Figure 9:
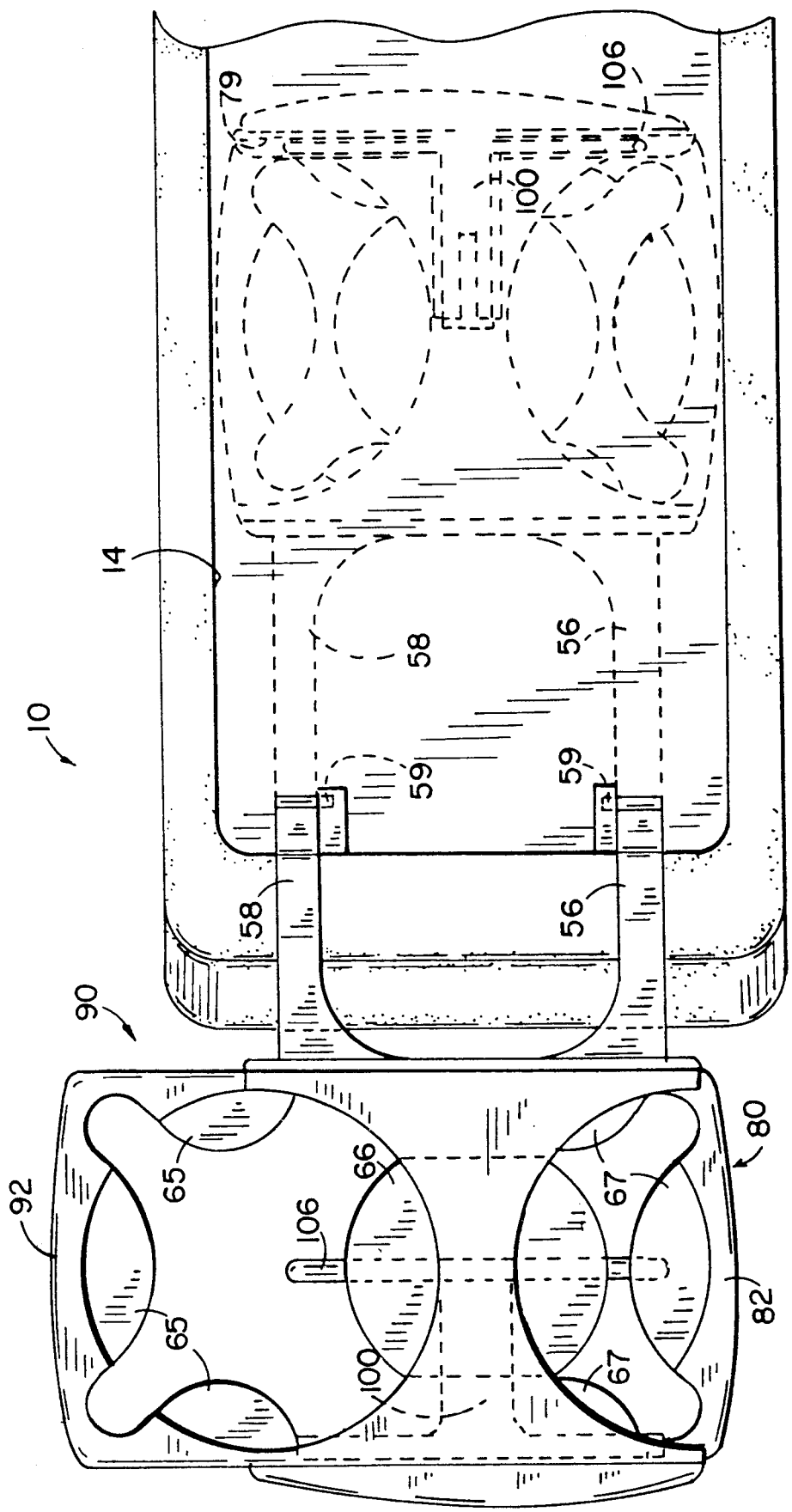
FIG. 9 is a top plan view of the structure shown in FIG. 8 shown in partially collapsed position and in a stored position in phantom form.

An alternative embodiment of the dual container holder of the present invention is illustrated in FIGS. 7-10 in which an upper base support member 50 is pivotally mounted to armrest 10. Member 50 includes a pair of rearwardly projecting legs 56 and 58 with offset ends including inwardly projecting facing stub axles 59 for snap fitting within circular sockets 61 formed in an armrest storage bin 63 into which the container holder 60 of this embodiment is pivotally mounted. The container base also includes a bottom section 70 underlying member 50 and having a plurality of transversely extending grooves 76 and 78 (FIG. 10) on opposite sides of semi-circular recesses 72 and 74 which align with recesses 52 and 54 respectively of upper base member 50 and which slideably receive a pair of side container support members 80 and 90. Each of the members 80 and 90 include upper and lower sides 82 and 84, 92 and 94, respectively, with the lower sides including outwardly projecting guide flanges 85 and 95 which lockably slide within tracks 75 of the center base sections 50 and 70 for controllably allowing the sliding motion of side members 80 and 90 between fully collapsed positions extending inwardly toward one another for compact storage of the container holder 60 as seen in FIG. 9 within a storage compartment 63 of armrest 10 and a fully extended position moved outwardly away from one another as shown in FIG. 8 for receiving two containers.

Resilient sheets 65, 66 and 67 of polymeric foam material are compressibly held between sections 92 and 94, 50 and 70, and 82 and 84, respectively for providing as best seen in FIG. 8, resilient flaps 69 extending into the circular openings defined by the semi-circular recesses of the base sections 50 and 70 and container support sides 80 and 90 respectively. Members 50 and 70, 82 and 84, and 92 and 94 are held together by a suitable bonding process such as heat fusion or an adhesive.

Figure 10:
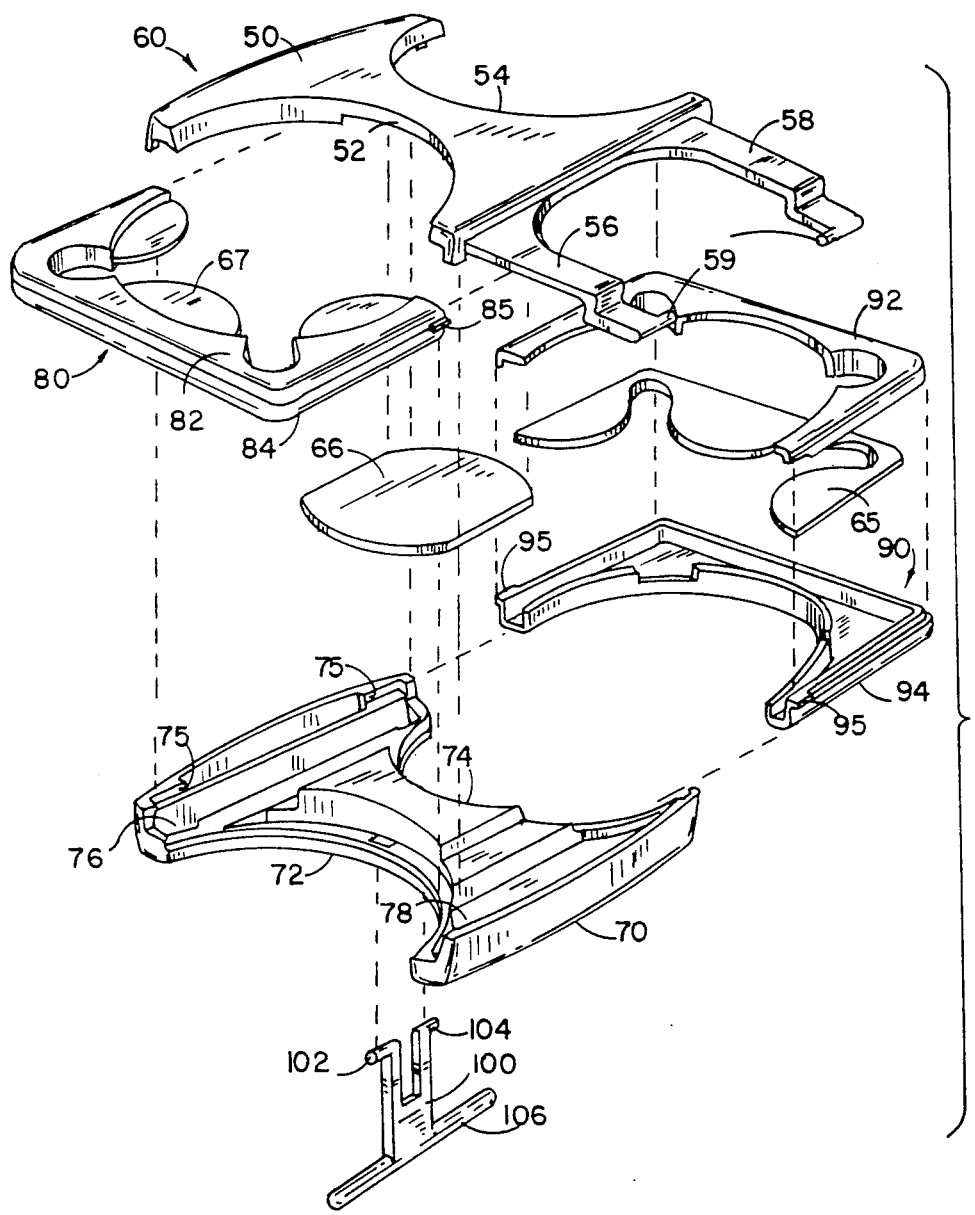
FIG. 10 is an exploded perspective view of the container holder shown in FIGS. 7-9.

In order to support the bottom of a container positioned within the apertures defined by the semi-circular container holding members, a generally T-shaped bail 100 as best seen in FIGS. 7 and 10 is pivotally mounted to the lower section 70 of the container holder by means of a pair of stub axles 102 and 104. Bail 100 includes a cross bar 106 which underlies, as best seen in FIG. 8, a portion of each of the circular apertures for supporting the floor of the container pushed downwardly into the aperture. For storage, the bail pivots upwardly in a direction indicated by arrow A in FIG. 7 into a T-shaped slot 79 (FIG. 9) in the lower section 70 of the container holder 60 for compact storage within compartment 63 of the armrest 10 as best seen in FIG. 9. As with the first embodiment of the container holder of the present invention, container holder 60 may be compactly stored within the space typically provided by a single container holder and further allow either section 80 and/or arm 90 to be extended therefrom for providing either side single or double container storage if desired. Container holder 60 is also molded of a suitable polymeric material.

Figure 11:
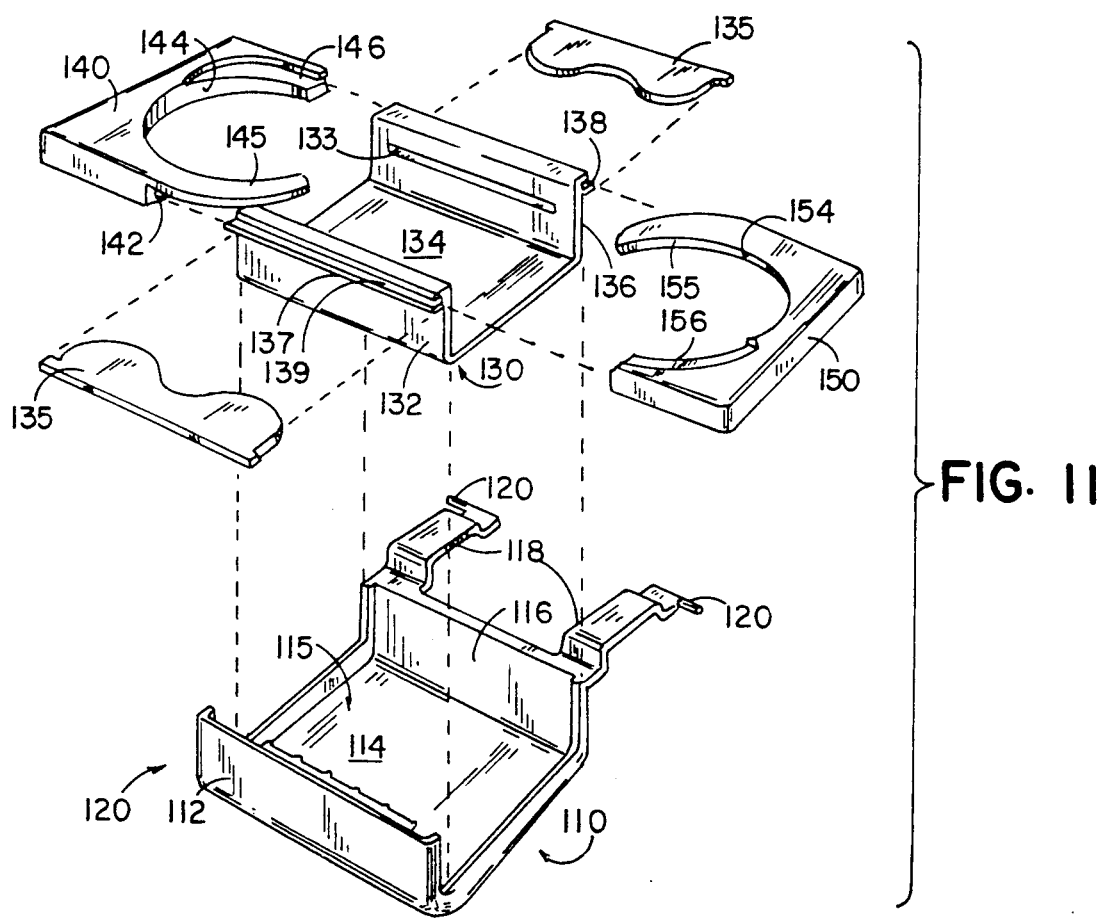
FIG. 11 is an exploded perspective view of an alternative embodiment of the present invention.

An alternative embodiment of the container holder shown in FIGS. 7-10 is illustrated in the exploded view of FIG. 11 in which a generally U-shaped support base 110 for the container holder 120 disclosed therein is provided. Base member 110 includes a forward wall 112, a floor 114, and a rear wall 116 from which there extends a pair of spaced rearwardly projecting legs 118, having stub axles 120 extending outwardly from an offset portion thereof for fitting within a circular socket of an armrest container into which the container holder is mounted in the same manner as holder 60. A generally U-shaped insert 130 extends downwardly into the central open area 115 of base 110 and includes a floor 134 and side walls 132 and 136 respectively. Each of the side walls includes a slot 133 for receiving resilient polymeric flaps 135 therein which project through the slots into the central opening of the U-shaped insert 130 for snugly fitting against the side wall of a container positioned therein.

A pair of sliding container support members 140 and 150 are slideably received by U-shaped guide slots 137 and 138 integrally formed on the top outer edges of walls 132 and 136 respectively for slideably receiving members 140 and 150 which are substantially identical pieces. Each of the members 140 and 150 include an inwardly projecting lip 142 on opposite ends thereof which interfits with and extends into the central opening 139 of each of the slots 137 and 138 for slideably mounting members 140 and 150 to insert member 130. Members 140 and 150 each define a circular opening 144 and 154 respectively which are defined in part by curved arcuate arms having tips 155 and 145 which nest within curved recesses 146 and 156 respectively of the opposite member when the two members are pushed inwardly toward one another to nest in alignment over insert member 130. In this position, the arcuate arms 155 and 145 enclose the container to form a single enclosed aperture for receiving a single container therein having its bottom resting upon floor 134 of insert 130.

Members 140 and 150 can be slid outwardly away from each other sufficiently such that the ends of arms 145 and 155 lie in tangency with one another, thereby defining two generally circular apertures in adjacent relationship for receiving two containers therein. Suitable stop means (not shown) can be provided to prevent members 140 and 150 from sliding completely out of tracks 137 and 138.

Thus, each of the container holders of the present invention, provide sliding interfitting multiple container holders which can operate as either a single or multiple container holder at the option of the user and which occupy relatively small space. Such a compact structure is particularly useful in modern vehicles in which space is at a premium and container holders are frequently mounted within vehicle armrests. It will become apparent to those skilled in the art that various modifications to the preferred embodiments of the present invention as described herein can be made without departing from the spirit or scope thereof as defined by the appended claims.

The embodiments of the invention in which an exclusive property or privilege is claimed are defined as follows:

1. A container holder for a vehicle comprising:
   a base member pivotally mounted to a vehicle and movable between a use position and a stored position, said base member including a pair of spaced guide and support slots facing one another; and
   a first and a second container support movably mounted to said base member and movable in a parallel plane with respect to each other, each container support individually defining at least a portion of a container supporting aperture for supporting a container therein, said first and second container supports each being movable toward and away form each other between a first position for concealed storage of said container holder and a second position in which at least one container can be supported therein, each of said first and second container supports including flange means extending outwardly from opposite sides thereof, said container supports being captively and slideably mounted into said slots.

2. A container holder for a vehicle comprising:
   a base member including laterally extending pivot means for pivotally mounting said base member to a compartment in a vehicle so that said base is movable between a use position and a stored position, said pivot means defining an axis of rotation; and
   first and second container supports movably mounted to said base member and movable in a common plane with respect to each other, said common plane being continuously parallel to said axis of rotation as said base member is pivoted between said use position and said storage position, each container support individually defining at least a portion of a container supporting aperture for supporting a container therein, said first and second container supports each being movable between a first position that allows concealed storage of said container holder and a second position in which at least one container can be supported therein.

3. The apparatus as defined in claim 2 wherein said first and second container supports are mounted to said base member for linear slideable movement toward and away from each other.

4. The apparatus as defined in claim 3 wherein said base member includes wall means defining at least a portion of a pair of opposed container receiving apertures.

5. The apparatus as defined in claim 4 wherein said base member further includes floor means spaced below said wall means for supporting the bottom of containers thereon.

6. The apparatus as defined in claim 5 wherein said floor means comprises a bail pivotally mounted to said base member for pivoting under said apertures when said base member is in a use position.

7. The apparatus as defined in claim 2 wherein said base member moves in a first direction when moving between said use position and said storage position, and said container supports move in a second direction normal to said first direction when moving between said first position and said second position.

8. The apparatus as defined in claim 7 wherein said container holder has a width, and said first and second container supports define said width, said width being smaller when said container supports are in said first position than when in said second position.

9. The apparatus as defined in claim 2 wherein said first and second container supports are independently movable relative to said base member to define either a single container supporting aperture or two container supporting apertures.

10. The apparatus as defined in claim 9 wherein said first container support is manually movable between said first and second positions where said container support remains when so moved.

11. The apparatus as defined in claim 2 including an armrest with a storage bin, and wherein said base member is pivotally mounted to said storage bin so that said base member is pivotable into said storage bin for storage.

12. The apparatus as defined in claim 11 wherein said pivot means includes legs that extend into said storage bin for pivotal attachment to said armrest.

13. The apparatus as defined in claim 12 wherein said storage bin includes sockets, and wherein said legs include stub axles that snap fit into said sockets, said base member being pivotable about said stub axles.

14. The apparatus as defined in claim 2 including resilient flaps attached to said container supports and extending at least partially into said container supporting apertures.

15. A container holder for a vehicle comprising:
   a base member including means for pivotally mounting said base member to a vehicle for movement between a use position and a stored position, the movement of said base member defining a first path; and
   first and second container holder supports slideably mounted to said base member and movable in parallel planes with respect to each other, the movement of said first and second container holder supports defining second and third paths, respectively, which are linear and generally transverse to said first path, said first and second container supports being movable between a first position for concealed storage of said container holder and a second position in which at least one container can be supported therein.

16. The apparatus as defined in claim 15 wherein said first and second container holder supports are selectively movable to hold one or two containers.

17. A container holder, comprising:
   a first member adapted to mount in a vehicle and including sides defining a recess having a predetermined width;
   a base member movably mounted to said first member for movement in a first direction between a first position in said recess and a second position extended from said recess, said base member defining a plane and including a first arcuate surface located in said plane which forms a part of a container holding aperture; and
   a container support operably mounted to said base member and movable in said plane in a second direction between a storage position in which said container support is positioned toward said base member, and a use position in which said container support is extended from said base member, said second direction being generally transverse to said first direction, and wherein said container support cooperates with said first arcuate surface to define a second part of the container holding aperture when in said use position to hold a container therein.

18. A container holder as defined in claim 17 wherein said base member includes a second arcuate surface opposite said first arcuate surface, and includes a second of said container supports positioned on a side of said base member facing said second arcuate surface, said first and said second container holders when in said use positions defining a first width that is greater than said predetermined width of said recess, and said container supports when in said storage position defining a second width that is less than said predetermined width of said recess, whereby the container supports can be moved to said storage position and said base member moved into said first position in said recess for compact storage, and wherein said base member can be moved to said use position with said container holders in said second position for supporting containers.

19. A container holder as defined in claim 17 wherein said container support when in said use position extends laterally in said plane from said base member such that said container support will engage a side of the first member if an operator attempts to move said base member into said first position in said recess.

20. A container holder as defined in claim 17 wherein said container support must be manually moved to said storage position before said base member can be moved to said first position in said recess.

21. A container holder, comprising:
- a first member adapted to mount in a vehicle and including sides defining a recess having a predetermined width;
- a base member movably mounted to said first member for movement in a first direction between a first position in said recess and a second position extended from said recess, said base member including a floor defining a plane; and
- a pair of container supports operably mounted to said base member and movable generally parallel to said plane in a second direction that is perpendicular to said first direction, said pair of container supports being slideably movable away from each other and including arcuate surfaces defining first and second container holding apertures for holding containers therein.

22. A container holder as defined in claim 21 wherein said arcuate surfaces extend more than 180°.

* * * * *

UNITED STATES PATENT AND TRADEMARK OFFICE
CERTIFICATE OF CORRECTION

PATENT NO. : 5,195,711

DATED : March 23, 1993

INVENTOR(S) : Gordon Miller et al.

It is certified that error appears in the above-identified patent and that said Letters Patent is hereby corrected as shown below:

Column 1, line 17;
    After "containers" insert --.--.

Column 5, line 13, claim 1;
    "form" should be --from--.

Column 8, line 6, claim 21;
    Delete "adapted to mount" and insert therefor --for mounting--.

Signed and Sealed this

Nineteenth Day of April, 1994

Attest:

BRUCE LEHMAN

*Attesting Officer*     *Commissioner of Patents and Trademarks*